T. M. HARRISON.
HOOD FASTENER.
APPLICATION FILED MAY 10, 1916.

1,207,547.

Patented Dec. 5, 1916.

Inventor:
Theodore Marfleet Harrison
By *[signature]*
Attorney.

UNITED STATES PATENT OFFICE.

THEODORE M. HARRISON, OF HAWTHORN, VICTORIA, AUSTRALIA.

HOOD-FASTENER.

1,207,547. Specification of Letters Patent. Patented Dec. 5, 1916.

Application filed May 10, 1916. Serial No. 96,564.

*To all whom it may concern:*

Be it known that I, THEODORE MARFLEET HARRISON, a subject of the King of Great Britain and Ireland, and a resident of the city of Hawthorn, a suburb of the city of Melbourne, in the county of Bourke, State of Victoria, Commonwealth of Australia, whose post-office address is 2 Hill street, in the said city of Hawthorn, have invented a new and useful Improved Hood-Fastener, of which the following is a specification.

The object of this invention is to provide a simple and reliable fastener for retaining the hoods of motor vehicles in a closed position, although in use it is not limited thereto.

The construction is cheap in first cost, simple to apply and is effective in use.

By the invention a motor hood may be held securely in its closed position and be quickly and easily unfastened for elevation and use. The fastener is unaffected by weather conditions and prevents movement and rattle of the hood when closed thereby lengthening the life of the latter.

Figure 1:
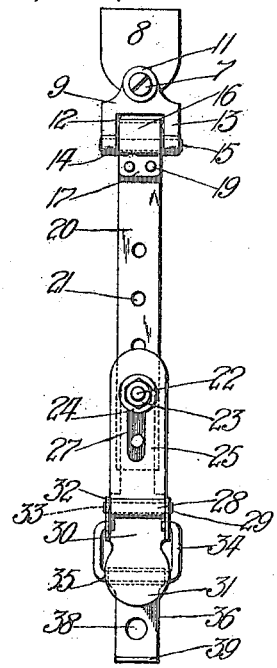
Figure 2:
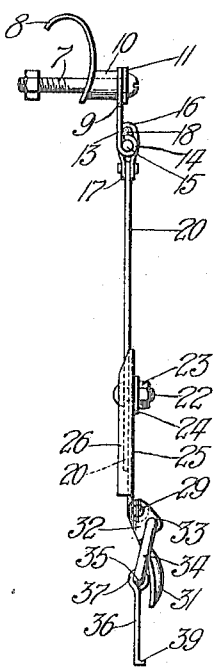
Figure 3:
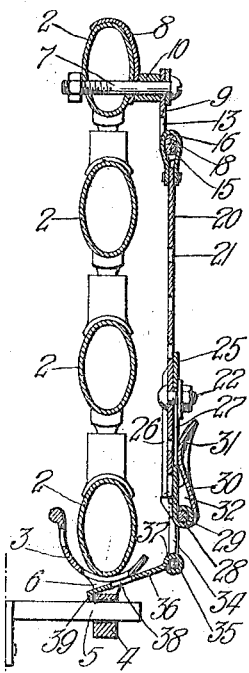
Figure 4:
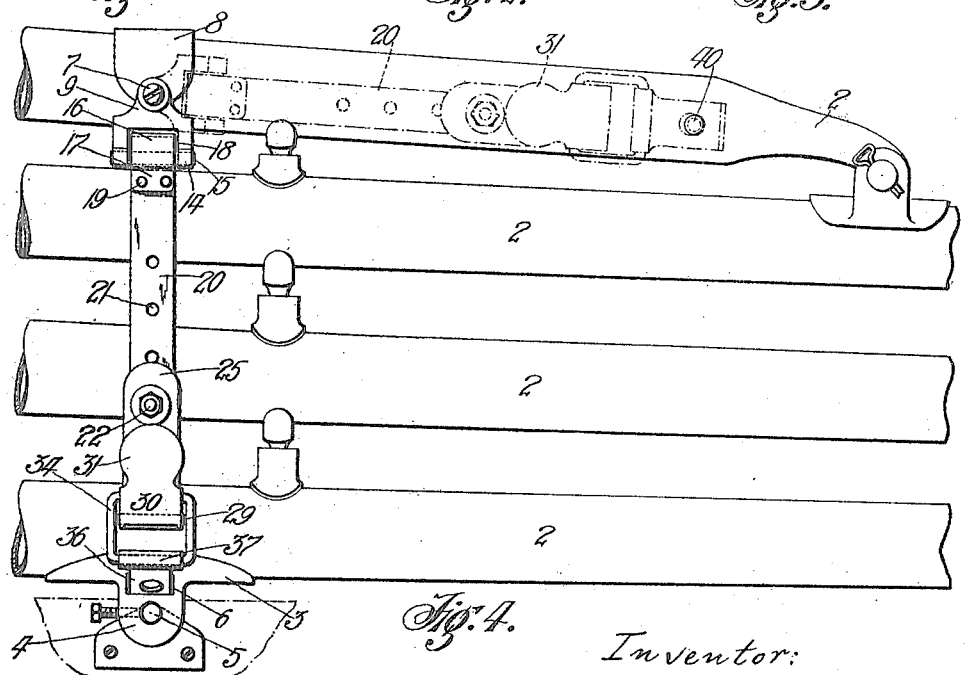

Referring to the drawings which form a part of this specification, Figure 1 is a front view of a fastener according to this invention. Fig. 2 is a side view of Fig. 1. Fig. 3 is a side sectional view showing the invention applied to a hood frame and locking the same in its closed position. Fig. 4 is a front view of Fig. 3, the fastener being shown in dotted lines in the position it occupies when the hood is opened.

The invention is applied to a hood frame having the usual bows 2. When the hood is closed the bottom bow of the hood frame usually rests in a cradle 3 of common design. The cradle is provided with a depending lug 4 and is mounted on a holding pin 5 projecting from the side of the vehicle. Passing through the depending lug of the cradle is a slotway 6.

The invention includes a swivel pin 7 carried by the upper bow of the hood frame. Carried by the swivel pin and resting on the upper bow of the hood frame is a saddle 8. Mounted on the swivel pin is a hinge member 9. Between this hinge member and the saddle is a distance piece 10 carried by the swivel pin 7. Outside the said hinge member is a washer 11. The said hinge member is cut away as at 12 thereby forming depending arms 13. These arms are folded as at 14 to provide bearings for a pivot pin 15. Encircling the pivot pin 15 between the arms 13 is a strap provided with a bowed portion 16 and legs 17. Within the bowed portion of the strap and above the pivot pin 15 is a rubber cushion 18. Instead of a rubber cushion being used a suitable spring may be applied in lieu thereof. Attached by rivets 19 to the legs of the strap is the upper end of a second hinge member 20. This hinge member 20 is provided with adjusting holes 21.

Attached to the second hinge member 20 by an adjusting screw 22 having thereon a suitable nut 23 and washer 24 is an extension piece 25. The said extension piece is provided with guide lips 26 along its sides. Within the extension piece is an adjusting slot 27. At the lower end of the extension piece 25 is a fold 28 accommodating a pivot pin 29. Pivoted to the pivot pin 29 is a thumb lever 30 having a thumb or pressure portion 31. The said thumb lever has also crank webs 32 in which are crank holes 33. Accommodated by the crank holes 33 are the arms 34 of a link having a bridging portion 35. Secured to the link is a catch plate 36 the fold 37 of which encircles the bridging portion 35 of the said link. The said catch plate is provided with a retaining pin hole 38 and a hook 39.

Carried by the upper bow of the hood frame is a retaining pin 40 provided with a head.

The invention operates as follows:—When the hood is closed and it is desired to lock the frame members thereof in such position the catch plate 36 is passed through the slotway 6 of the cradle 3. The thumb lever 30 is then pressed upwardly turning on the pivot pin 29. As the thumb lever is pressed up the crank webs lift the link and draw the hook 39 against the side of the cradle. The thumb lever then swings on the arms 34 of the link pressing the pivot pin 29 and the hinge member 20 downwardly and compressing the cushion 18. As the pivot pin 29 and the crank holes 33 pass vertical alinement the pressure portion 31 of the crank lever springs inwardly against the extension piece. The hook 39 is now drawn tightly against the side of the lug 4 of the cradle effectually locking the bows of the hood together. When it is desired to open the hood the thumb lever is pulled downwardly. This relaxes the pressure on the cushion 18 and the pull on the hook 39. The catch plate 36 is then withdrawn from the slot of the cradle and the fastener is swung bodily around on the swivel pin 7 until the retaining pin hole 38 of the catch plate is over the retaining pin 40 on the top bow of the hood frame. The thumb lever is then pressed toward the swivel pin as before. This locks the edge of the retaining pin hole 38 against the retaining pin 40. The hood is now free to be opened.

Having now described my invention what I claim as new and desire to secure by Letters Patent is:—

1. In a hood fastener, the combination, with a hood frame and a cradle; of a swivel pin carried by the hood frame; a hinge-member mounted on said pin; a depending hinge member having its upper end pivotally connected to the first hinge member; an extension piece adjustably connected to the second hinge member; a cam-lever pivotally connected with said extension piece; a catch plate connected to be operated by said lever and adapted to engage said cradle, to lock the hood in closed position; and a retaining pin carried by said hood frame for engagement by said catch plate when the hood is opened.

2. In a hood fastener, the combination of a swivel pin; a forked hinge member mounted thereon; a pivot pin mounted in the fork of said hinge member; a depending hinge member pivoted at its upper end on said pivot pin, the latter and the said end of the hinge member having an elastic cushion interposed therebetween; an extension piece adjustably connected to the second hinge member; a cam-lever pivotally connected with said extension piece; and a catch plate connected to be operated by said lever.

3. In a fastener for the hoods of motor vehicles and like purposes, a swivel pin, a hinge member mounted on said swivel pin, a pivot pin carried by said hinge member, a strap around the pivot pin, cushioning means between the strap and the pivot pin, a hinge member carried by the strap, an extension piece carried by the second hinge member, guide lips to said extension piece, adjusting means carried by the extension piece and the second hinge member, a second pivot pin carried by the extension piece, a thumb lever mounted on the second pivot pin, crank webs to said thumb lever, a link mounted in said crank webs, a perforated catch plate carried by the link and a hook on said catch plate.

4. In a fastener for hoods of motor vehicles and like purposes, a swivel pin, a saddle carried by the swivel pin, a hinge member mounted on said swivel pin, a distance piece between said saddle and said hinge member, arms on said hinge member, a pivot pin carried by said arms, a strap mounted on the pivot pin between said arms, a bowed portion to said strap, cushioning means within the bowed portion, a hinge member carried by the strap, a slotted extension piece carried by the second hinge member, guide lips to said extension piece, an adjusting screw locking said extension piece to the second hinge member, a pivot pin carried by said extension piece, a thumb lever pivoted to the second pivot pin, crank webs and a pressure portion on said thumb lever, a link pivotally mounted in said crank webs, a perforated catch plate pivoted to said link and a hooked end on said catch plate.

In testimony whereof I affix my signature.

THEO. M. HARRISON.

Copies of this patent may be obtained for five cents each, by addressing the "Commissioner of Patents, Washington, D. C."